(12) United States Patent
Okamoto et al.

(10) Patent No.: US 9,685,643 B2
(45) Date of Patent: *Jun. 20, 2017

(54) ELECTRIC STORAGE DEVICE (71) Applicant: GS Yuasa International Ltd., Kyoto-shi (JP)

(72) Inventors: Katsuhiko Okamoto, Kyoto (JP); Shinsuke Yoshitake, Kyoto (JP); Jun Nakamura, Kyoto (JP); Masakazu Tsutsumi, Kyoto (JP); Nobuyuki Naganawa, Kyoto (JP)

(73) Assignee: GS YUASA INTERNATIONAL LTD., Kyoto-Shi, Kyoto (JP)

( * ) Notice: Subject to any disclaimer, the term of this patent is extended or adjusted under 35 U.S.C. 154(b) by 732 days.

This patent is subject to a terminal disclaimer.

(21) Appl. No.: 14/069,972

(22) Filed: Nov. 1, 2013

(65) Prior Publication Data
US 2014/0057135 A1    Feb. 27, 2014

Related U.S. Application Data (63) Continuation of application No. 13/336,947, filed on Dec. 23, 2011, now Pat. No. 8,598,471.

(30) Foreign Application Priority Data

Dec. 28, 2010  (JP) .................. 2010-293138
Dec. 28, 2010  (JP) .................. 2010-293140

(51) Int. Cl.
*H01M 2/06* (2006.01)
*H01M 2/04* (2006.01)
*H01M 2/30* (2006.01)

(52) U.S. Cl.
CPC .............. *H01M 2/06* (2013.01); *H01M 2/04* (2013.01); *H01M 2/30* (2013.01)

(58) Field of Classification Search
CPC ....................................................... H01M 2/06
See application file for complete search history.

(56) References Cited

U.S. PATENT DOCUMENTS 3,548,264 A    12/1970  Bainbridge et al.
3,680,203 A    8/1972   Braiman et al.
(Continued)

FOREIGN PATENT DOCUMENTS

CN    2701082 Y    5/2008
CN    101578723 A  11/2009
(Continued)

OTHER PUBLICATIONS

United States Office Action dated Jul. 2, 2014 in Co-Pending U.S. Appl. No. 14/254,624.
(Continued)

*Primary Examiner* — Maria J Laios
(74) *Attorney, Agent, or Firm* — McGinn IP Law Group, PLLC.

(57) ABSTRACT

An electric storage device includes an electrode assembly, a case housing the electrode assembly, a plastic member arranged at an outer surface of the case and including a joining surface facing the outer surface of the case, an external terminal supported by the plastic member and electrically connected to the electrode assembly, a sealing member arranged at the outer surface of the case, the sealing member including a joining surface facing the outer surface of the case, and an auxiliary terminal supported by the sealing member, the auxiliary terminal extending from inside to outside the case, being electrically connected to the electrode assembly, and being electrically connected to the external terminal. The plastic member includes a material having a hardness greater than a hardness of the sealing member.

20 Claims, 7 Drawing Sheets

(56) References Cited

U.S. PATENT DOCUMENTS

| | | | |
|---|---|---|---|
| 3,686,538 A | 8/1972 | Webster | |
| 4,045,862 A | 9/1977 | Evans et al. | |
| 4,074,417 A | 2/1978 | Pearce et al. | |
| 5,360,685 A | 11/1994 | Tanaka | |
| 5,624,771 A * | 4/1997 | Sano | H01M 2/08 29/623.2 |
| 5,656,392 A | 8/1997 | Sano et al. | |
| 5,849,431 A | 12/1998 | Kita et al. | |
| 6,190,798 B1 | 2/2001 | Okada et al. | |
| 6,573,000 B1 | 6/2003 | Miyazaki et al. | |
| 6,579,640 B1 | 6/2003 | Nagase et al. | |
| 6,746,798 B1 | 6/2004 | Hiratsuka et al. | |
| 6,838,207 B1 | 1/2005 | Sugita | |
| 7,335,442 B2 | 2/2008 | Nakanishi et al. | |
| 7,968,228 B2 | 6/2011 | Park et al. | |
| 8,598,471 B2 * | 12/2013 | Okamoto | H01M 2/04 174/549 |
| 8,748,034 B2 | 6/2014 | Sasaki et al. | |
| 2003/0118902 A1 | 6/2003 | Schubert et al. | |
| 2004/0023108 A1 | 2/2004 | Nakanishi et al. | |
| 2005/0000090 A1 | 1/2005 | Ratte | |
| 2006/0003222 A1 | 1/2006 | Mushiga et al. | |
| 2006/0051664 A1 | 3/2006 | Tasai et al. | |
| 2006/0093907 A1 * | 5/2006 | Jeon | H01M 2/0404 429/180 |
| 2007/0037053 A1 | 2/2007 | Anantharaman | |
| 2008/0131760 A1 * | 6/2008 | Yamagami | B29C 45/14065 429/82 |
| 2008/0220316 A1 | 9/2008 | Berkowitz et al. | |
| 2009/0169989 A1 | 7/2009 | Morikawa et al. | |
| 2010/0021811 A1 | 1/2010 | Kado et al. | |
| 2010/0047686 A1 * | 2/2010 | Tsuchiya | H01M 2/202 429/178 |
| 2010/0081048 A1 | 4/2010 | Nansaka et al. | |
| 2010/0092858 A1 | 4/2010 | Takashiro et al. | |
| 2010/0129709 A1 | 5/2010 | Matsubara | |
| 2010/0173178 A1 | 7/2010 | Kim et al. | |
| 2011/0052977 A1 * | 3/2011 | Kurata | H01M 2/06 429/179 |
| 2011/0076543 A1 | 3/2011 | Ro | |
| 2011/0076552 A1 | 3/2011 | Taniguchi et al. | |
| 2011/0086253 A1 * | 4/2011 | Pompetzki | H01M 2/0277 429/62 |
| 2011/0092111 A1 | 4/2011 | Tsuchiya et al. | |
| 2011/0159356 A1 | 6/2011 | Tozuka et al. | |
| 2012/0258355 A1 | 10/2012 | Guen | |
| 2012/0264001 A1 | 10/2012 | Tsuchiya et al. | |
| 2012/0264003 A1 | 10/2012 | Tsuchiya et al. | |
| 2012/0264004 A1 | 10/2012 | Tsuchiya et al. | |
| 2012/0264005 A1 | 10/2012 | Tsuchiya et al. | |
| 2012/0264006 A1 | 10/2012 | Tsuchiya et al. | |

FOREIGN PATENT DOCUMENTS

| | | |
|---|---|---|
| GB | 2 154 049 A | 8/1985 |
| JP | 59-58754 A | 4/1984 |
| JP | 2-54162 | 4/1990 |
| JP | H07-032490 A | 2/1995 |
| JP | 8-321287 A | 12/1996 |
| JP | 10-125291 A | 5/1998 |
| JP | 11-195561 A | 7/1999 |
| JP | 2000-268781 A | 9/2000 |
| JP | 2000-277081 A | 10/2000 |
| JP | 2001-093485 A | 4/2001 |
| JP | 2001-126684 A | 5/2001 |
| JP | 2001-357833 A | 12/2001 |
| JP | 2002-175797 A | 6/2002 |
| JP | 2002-245991 A | 8/2002 |
| JP | 2002-324541 A | 11/2002 |
| JP | 2003-92103 A | 3/2003 |
| JP | 2003-323869 A | 11/2003 |
| JP | 2003-346774 A | 12/2003 |
| JP | 2003-346778 A | 12/2003 |
| JP | 2004-296447 A | 10/2004 |
| JP | 3612629 B2 | 1/2005 |
| JP | 2005-56649 A | 3/2005 |
| JP | 3708183 B2 | 10/2005 |
| JP | 2005-310569 A | 11/2005 |
| JP | 2006-19093 A | 1/2006 |
| JP | 2006-216411 A | 8/2006 |
| JP | 2007-107048 A | 4/2007 |
| JP | 3985805 B2 | 10/2007 |
| JP | 2008-27823 A | 2/2008 |
| JP | 2008-218244 A | 9/2008 |
| JP | 2008-251213 A | 10/2008 |
| JP | 2008-305645 A | 12/2008 |
| JP | 2009-52126 A | 3/2009 |
| JP | 2009-54531 A | 3/2009 |
| JP | 2009-181782 A | 8/2009 |
| JP | 2009-259424 A | 11/2009 |
| JP | 2009-259739 A | 11/2009 |
| JP | 2009-277604 A | 11/2009 |
| JP | 2009-289637 A | 12/2009 |
| JP | 2010-40533 A | 2/2010 |
| JP | 2010-97764 A | 4/2010 |
| JP | 2010-97822 A | 4/2010 |
| JP | 2010-157415 A | 7/2010 |
| WO | WO 2008/016152 A1 | 2/2008 |
| WO | WO 2008/084883 A2 | 7/2008 |
| WO | WO 2009/107657 A1 | 9/2009 |
| WO | WO 2009/150917 A1 | 12/2009 |
| WO | WO 2010/001975 A1 | 1/2010 |

OTHER PUBLICATIONS

U.S. Office Action dated Aug. 14, 2013 in U.S. Appl. No. 13/087,130.
United States Office Action dated Jan. 28, 2015 in Co-Pending U.S. Appl. No. 14/254,624.
United States Office Action dated Mar. 16, 2015 in U.S. Appl. No. 13/354,193.
United States Office Action dated Jul. 7, 2015 in U.S. Appl. No. 13/354,193.
United States Office Action dated Oct. 7, 2015 in U.S. Appl. No. 14/732,415.
US Office Action dated Jan. 5, 2016 in co-pending U.S. Appl. No. 13/354,193.
United States Office Action dated May 9, 2016 in U.S. Appl. No. 13/354,193.
Notice of Allowance dated Feb. 24, 2016 in U.S. Appl. No. 14/732,415.
Specification (pp. 1-33) and Drawings (Figs. 1-7) of related co-pending U.S. Appl. No. 13/087,146.
Specification (pp. 1-43) and Drawings (Figs. 1-8) of related co-pending U.S. Appl. No. 13/087,130.
Specification (pp. 1-37) and Drawings (Figs. 1-9) of related co-pending U.S. Appl. No. 13/354,193 (US Patent Application Publication No. 2012/0189908 A1.
US Office Action for co-pending related U.S. Appl. No. 13/087,130 dated Apr. 10, 2013.
US Office Action for co-pending related U.S. Appl. No. 13/087,146 dated Apr. 10, 2013.
Extended European Search Report dated Apr. 17, 2012.
Extended European Search Report dated May 7, 2012.
US Office Action for co-pending related U.S. Appl. No. 13/087,130 dated Nov. 13, 2012.
US Office Action for co-pending related U.S. Appl. No. 13/087,146 dated Nov. 13, 2012.
United States Office Action dated Aug. 14, 2013, in U.S. Appl. No. 13/336,954.
Notice of Allowance dated Jul. 18, 2013 in U.S. Appl. No. 13/336,947.
Wei Lei et al., "Study on Reinforcing and Toughening of Polyphenylene Sulfide", China Plastics Industry, pp. 19-21, Apr. 2009.

* cited by examiner

ELECTRIC STORAGE DEVICE

CROSS-REFERENCE TO RELATED APPLICATIONS

The present application is a Continuation Application of U.S. patent application Ser. No. 13/336,947, filed on Dec. 23, 2011, which is based on and claims priority from Japanese Patent Applications Nos. 2010-293138 and 2010-293140, each filed on Dec. 28, 2010, the disclosures of which are incorporated herein by reference in their entireties.

FIELD OF THE INVENTION

The present invention relates to an electric storage device including an external terminal.

BACKGROUND ART

In recent years, rechargeable and dischargeable electric storage devices such as battery cells (e.g., a lithium ion battery cell and a nickel-metal hydride battery cell) and capacitors (e.g., an electric double layer capacitor) have been adopted as the power sources of vehicles (e.g., an automobile and a motorcycle) and various devices (e.g., a portable terminal and a laptop computer). For example, a battery cell includes an electrode assembly and a case composed of a case body which houses the electrode assembly and a cover plate which covers an opening of the case body. An external terminal is arranged at an outer surface of the cover plate, a current collector is connected to the electrode assembly, the current collector is arranged inside the case, and the external terminal and the current collector are directly or indirectly connected to each other. With this configuration, the external terminal and the electrode assembly are electrically connected.

There are two main methods for connecting an external terminal and a current collector. One is to directly connect an external terminal and a current collector, and the other is to indirectly connect an external terminal and a current collector via an auxiliary terminal and a connecting conductor.

The former method uses an external terminal which is composed of a body, a caulking part projecting from a lower surface of the body, and a male thread part projecting from an upper surface of the body. The external terminal is arranged at an outer surface of a cover plate via a sealing member, the caulking part of the external terminal is inserted into a through-hole of a current collector inside a case, and an end portion of the caulking part projecting downward from the through-hole is caulked from below. With this configuration, the external terminal and the current collector are directly connected to each other (Patent Document 1: JP-A-2001-357833).

The latter method uses an auxiliary terminal composed of a body, a first caulking part projecting from a lower surface of the body, and a second caulking part projecting from an upper surface of the body, an external terminal composed of a head and a male thread part projecting from an upper surface of the head, and a connecting conductor including through-holes into which the second caulking part of the auxiliary terminal and the male thread part of the external terminal are to be inserted. The auxiliary terminal is arranged at an outer surface of a cover plate via a sealing member, the first caulking part of the auxiliary terminal is inserted into a through-hole of a current collector inside a case, and an end portion of the first caulking part projecting downward from the through-hole is caulked from below. The external terminal is arranged at the outer surface of the cover plate via the sealing member, the second caulking part of the auxiliary terminal and the male thread part of the external terminal are inserted into the through-holes of the connecting conductor, and an end portion of the second caulking part projecting upward from the through-hole is caulked from above. With this configuration, the external terminal and the current collector are indirectly connected via the auxiliary terminal and the connecting conductor (Patent Document 2: Japanese Patent Laid-Open No. 2003-346774).

In either of the methods, a crimp contact of a lead wire of an external device fits on the male thread part of the external terminal, and the male thread part is fixed with a nut. With this configuration, the crimp contact of the lead wire is electrically connected to an electrode assembly, which causes the external device to be electrically connected to a battery cell.

According to the latter method, since the external terminal and the auxiliary terminal are separated from each other, rotational torque applied to the external terminal when the nut is tightened is not transmitted to the auxiliary terminal. For this reason, a situation does not occur in which rotation of the auxiliary terminal causes the auxiliary terminal and a connection part of the current collector fixed by caulking to come loose to impair the connection therebetween. The latter method is superior in this respect to the former method.

However, even in the latter method, rotational torque applied to the external terminal when the nut is tightened is directly transmitted to the sealing member. Accordingly, sealing with the sealing member may be impaired. In order to solve the problem, a structure including a terminal retainer provided separately from a sealing member and an external terminal arranged at an outer surface of a cover plate via the terminal retainer has been proposed (Patent Document 3: Japanese Patent Laid-Open No. 2010-97764).

Not only the sealing member disclosed in Patent Document 1 ("the upper gasket plate 6" in Patent Document 1) and the sealing member disclosed in Patent Document 2 ("the insulating sealer 7" in Patent Document 2) but also the terminal retainer disclosed in Patent Document 3 ("the retainer 10" in Patent Document 3) receives torque from the external terminal as it stops rotation of the external terminal when a nut is tightened. Accordingly, the sealing members and the terminal retainer (which are each made of plastic and are collectively called "plastic members") each need to be securely fixed to the outer surface of the cover plate to overcome rotational torque from the external terminal.

In this respect, Patent Document 3 discloses the process of forming the terminal retainer by finishing a part where the terminal retainer is fastened of a metal surface at the outer surface of the cover plate so as to have microscopic asperities, arranging a mold to surround the part, pouring molten resin into the mold, and solidifying the resin and the process of directly injection molding the terminal retainer at the outer surface of the cover plate (cf., paragraph [0036]).

However, these methods involve complicated work processes and high cost. The same applies to capacitors (e.g., an electric double layer capacitor).

SUMMARY OF THE INVENTION

The present invention has an object to provide a novel fastening structure of a plastic member which can reduce cost with a simple configuration.

An electric storage device according to the present invention includes:

an electrode assembly;

a case housing the electrode assembly;

a plastic member arranged at an outer surface of the case and having a joining surface facing the outer surface of the case; and an external terminal supported by the plastic member and electrically connected to the electrode assembly, wherein the plastic member is a synthetic resin containing an inorganic fiber and is bonded to the outer surface of the case at least with the inorganic fiber exposed at the joining surface.

In another embodiment of the electric storage device according to the present invention, the plastic member may comprise a resin material obtained by uniformly mixing a synthetic resin material with glass fiber as a filler.

In this case, polyphenylene sulfide (PPS) resin or polytetrafluoroethylene-perfluoroalkylvinylether copolymer (PFA) resin may be used as the synthetic resin material.

As a first embodiment, the electric storage device may further include:

a sealing member arranged at the outer surface of the case, the sealing member having a joining surface facing the outer surface of the case; and an auxiliary terminal supported by the sealing member, the auxiliary terminal extending from inside to outside the case, being electrically connected to the electrode assembly, and being electrically connected to the external terminal.

As a second embodiment of the electric storage device, the plastic member may be a sealing member, and the device may further include an auxiliary terminal supported by the sealing member together with the external terminal, the auxiliary terminal extending from inside to outside the case, being electrically connected to the electrode assembly, and being electrically connected to the external terminal.

As a third embodiment of the electric storage device, the plastic member may be a sealing member, and the external terminal may extend from inside to outside the case and be electrically connected to the electrode assembly.

Note that if a sealing member is provided separately from the plastic member (in the case of the electric storage device according to the first embodiment), the electric storage device may further include: a current collector connected to the electrode assembly and connected to the auxiliary terminal; and a connecting conductor connecting together the auxiliary terminal and the external terminal. Furthermore, the plastic member may preferably comprise a material having hardness higher than hardness of the sealing member.

In still another embodiment of the electric storage device of the present invention, the case may include a non-circular recess which can receive at least a part of the joining surface of the plastic member in a predetermined region of the outer surface of the case.

In yet another embodiment of the electric storage device of the present invention, the case may include a non-circular recess which can receive at least a part of the joining surface of the sealing member in a predetermined region of the outer surface of the case.

In this case, the plastic member and the sealing member may be arranged close to each other, and the area of the recess for the sealing member may be larger than the area of the recess for the plastic member.

In another embodiment of the electric storage device of the present invention, the plastic member may include a surrounding circumferential outer wall part and a recess inside the outer wall part, the external terminal may include a head to be inserted into the recess of the plastic member and a shaft projecting from one surface of the head, and the outer wall part of the plastic member may be formed to be high enough for the recess of the plastic member to entirely or substantially entirely receive the head of the external terminal.

In still another embodiment of the electric storage device of the present invention, the external terminal may include a head and a shaft projecting from one surface of the head, and the shaft may include a male thread part.

In yet another embodiment of the electric storage device of the present invention, the plastic member may be bonded to the outer surface of the case with an adhesive. In this case, the adhesive may preferably be an epoxy resin adhesive.

In another embodiment of the electric storage device of the present invention, the case may include a case body including an opening and a cover plate which covers the opening of the case body to seal the case, and the plastic member may be arranged at an outer surface of the cover plate.

DETAILED DESCRIPTION OF THE PREFERRED EMBODIMENTS

A battery cell which is an embodiment of an electric storage device according to the present invention will be described below with reference to the drawings. A battery cell according to the present embodiment is a non-aqueous electrolyte secondary battery cell and, more particularly, a lithium ion secondary battery cell. As shown in FIGS. 1 to 4, the battery cell according to the present embodiment includes a case 1 which is composed of a case body 2 and a cover plate 3 which covers an opening of the case body 2 to seal the case 1. The cover plate 3 includes terminal structures 9 which are electrically connected to an electrode assembly 4 housed in the case 1.

The case body 2 and cover plate 3 of the case 1 are metal members made of an aluminum alloy, steel, or the like. The case body 2 is a rectangular box flattened in the width direction so as to house the wound electrode assembly 4 that has been formed into an elliptic cylinder. The cover plate 3 is a rectangular plate material corresponding to the opening of the case body 2. The cover plate 3 fits in the opening of the case body 2 and is fixed to the case body 2 by laser welding or the like so as to seal the opening.

In the electrode assembly 4, a band-shaped positive electrode sheet 5 and a band-shaped negative electrode sheet 6 which are displaced to each other in different lateral directions with a band-shaped separator 7 sandwiched therebetween are wound about a lateral rotation axis into a cylinder in the shape of a vertically long ellipse. The electrode assembly 4 is entirely covered with an insulating cover (not shown) comprising an insulating sheet and is housed in the case 1 while being insulated from the case 1. The positive electrode sheet 5 includes aluminum foil carrying a positive electrode active material at the surface. The negative electrode sheet 6 includes copper foil carrying a negative electrode active material at the surface. The positive electrode sheet 5 and the negative electrode sheet 6 each have a non-overlapped portion not coated with the active material at an edge in the lateral direction in which the sheet is displaced. With this arrangement, at the lateral ends of the electrode assembly 4, the aluminum foil and copper foil are exposed, and thus these metal foils of the positive electrode and negative electrode project from the overlapped portion in a wound configuration.

Metal foils projecting at the lateral ends of the electrode assembly 4 are electrically connected to respective current collectors 8. The current collectors 8 are vertically long conductive metal members. More specifically, the current collector 8 for the positive electrode comprises aluminum or an aluminum alloy, and the current collector 8 for the negative electrode comprises copper or a copper alloy. An upper part of each current collector 8 is horizontally bent to constitute a connection part 8a. A part extending downward from the connection part 8a is divided into a front part and a rear part, which project downward. The two front and rear parts are sandwiched between holding plates (not shown) together with the corresponding end of the electrode assembly 4 and are connected and fixed by ultrasonic welding or the like.

The terminal structures 9 include the terminal structure 9 for the positive electrode and the terminal structure 9 for the negative electrode. As shown in more detail in FIGS. 5 to 7, each terminal structure 9 includes a plastic plate 10, an outer gasket 11, a rivet 12, a terminal retainer 13, a terminal bolt 14, and a connecting plate 15. The plastic plate 10 and outer gasket 11 are arranged inside and outside the case 1 with through-holes 3a formed in the right and left ends of the cover plate 3 interposed therebetween. The rivet 12 is inserted into the through-hole 3a via the plastic plate 10 and outer gasket 11 and is electrically connected to the connection part 8a of the current collector 8. The terminal retainer 13 is arranged close to the outer gasket 11. The terminal bolt 14 is arranged at an outer surface of the cover plate 3 via the terminal retainer 13. The connecting plate 15 electrically connects the terminal bolt 14 and the rivet 12. With this configuration, the electrode assembly 4 inside the case 1 and the terminal bolt 14 are electrically connected to each other.

Figure 1:
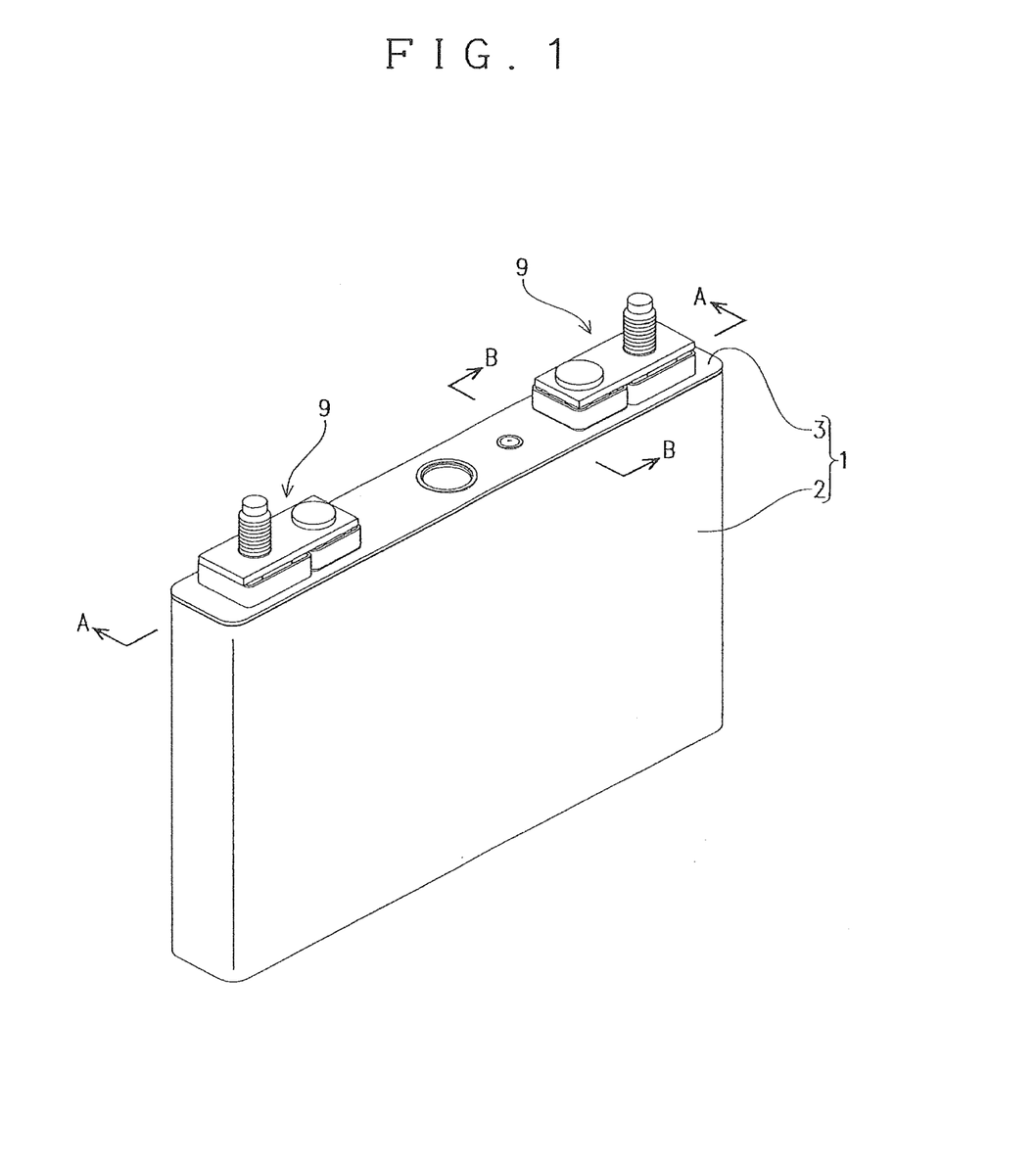
FIG. 1 is a perspective view of a battery cell according to an embodiment of the present invention.
Figure 2:
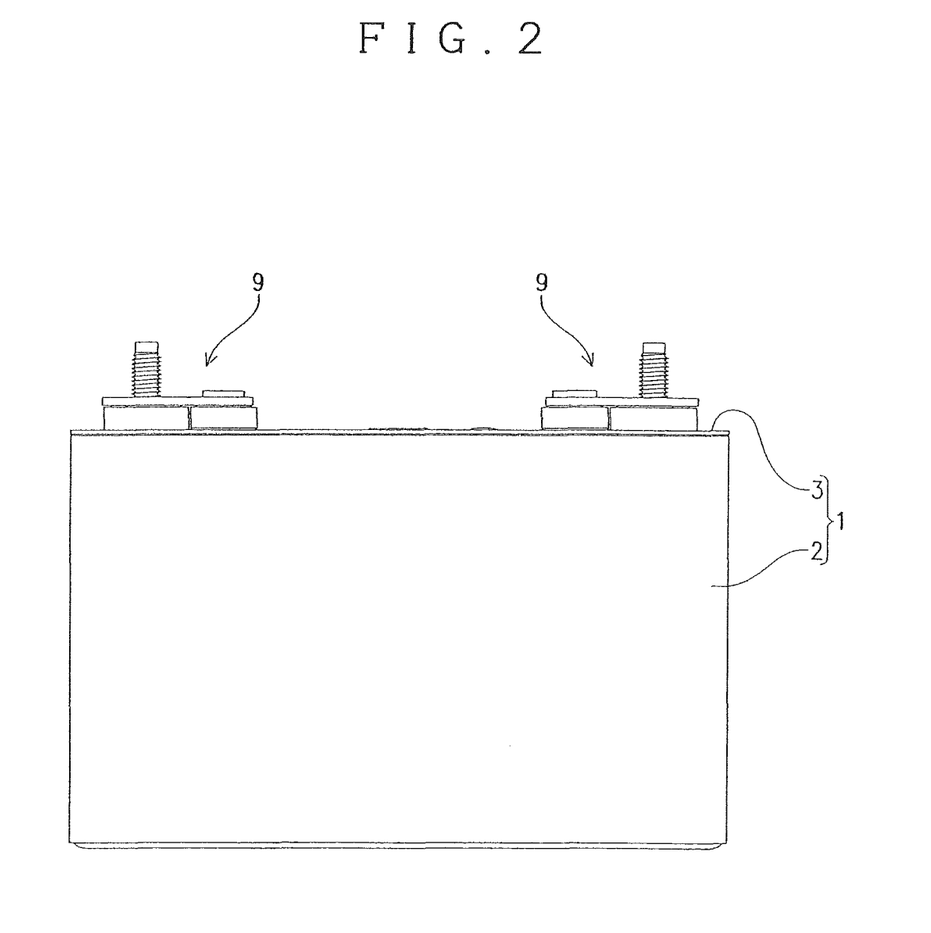
FIG. 2 is a side view of the battery cell.
Figure 3:
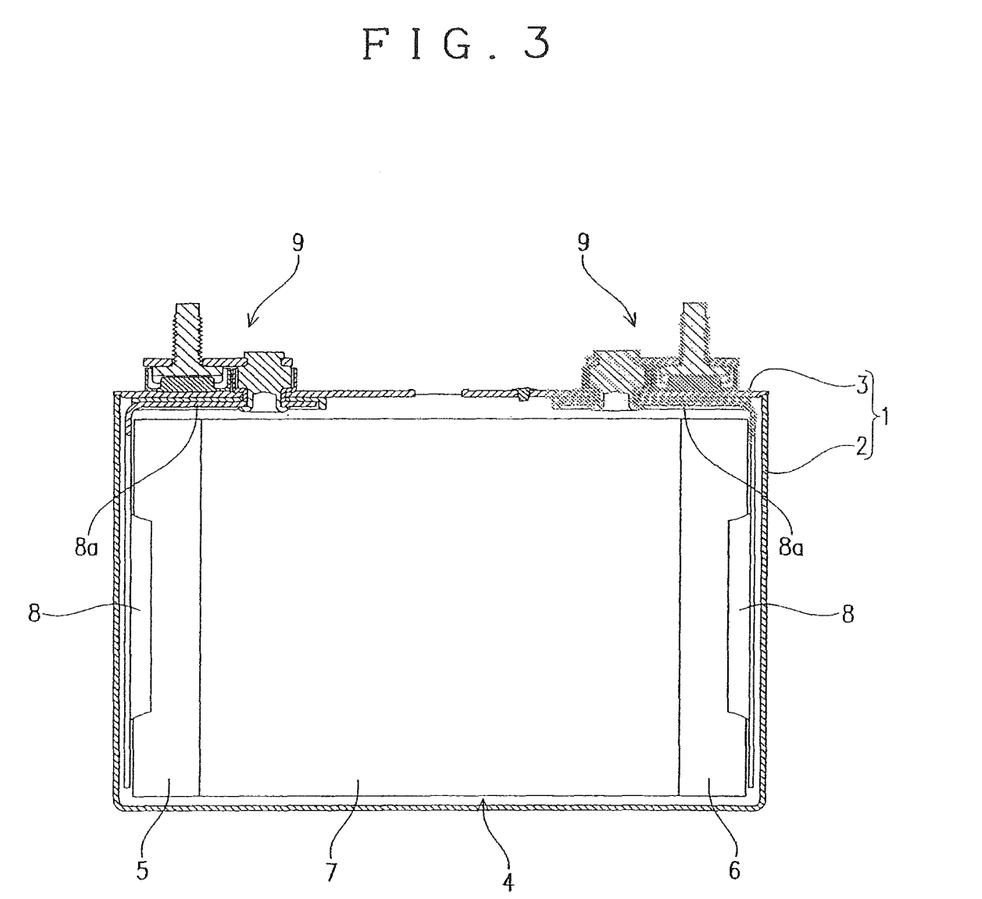
FIG. 3 is a cross-sectional view taken along line A-A in FIG. 1.
Figure 4:
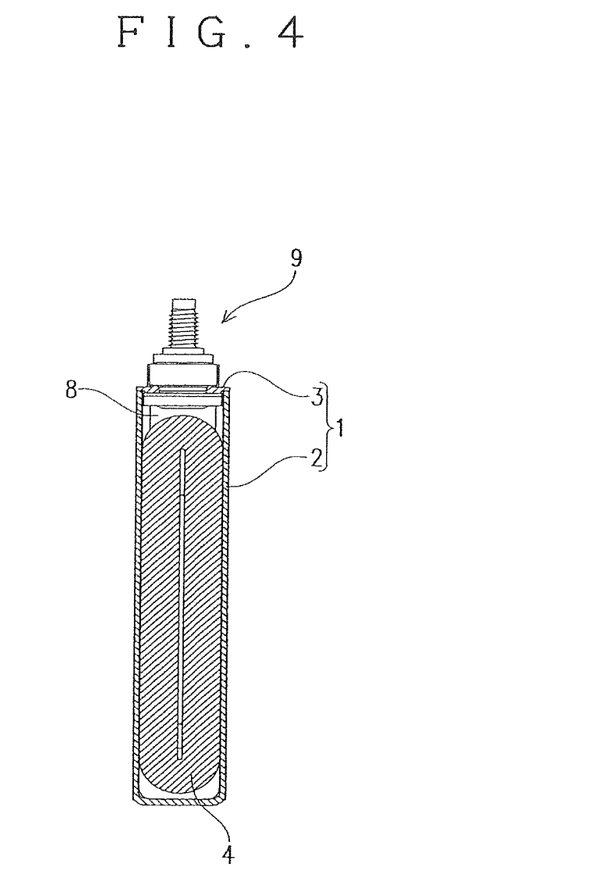
FIG. 4 is a cross-sectional view taken along line B-B in FIG. 1.
Figure 5:
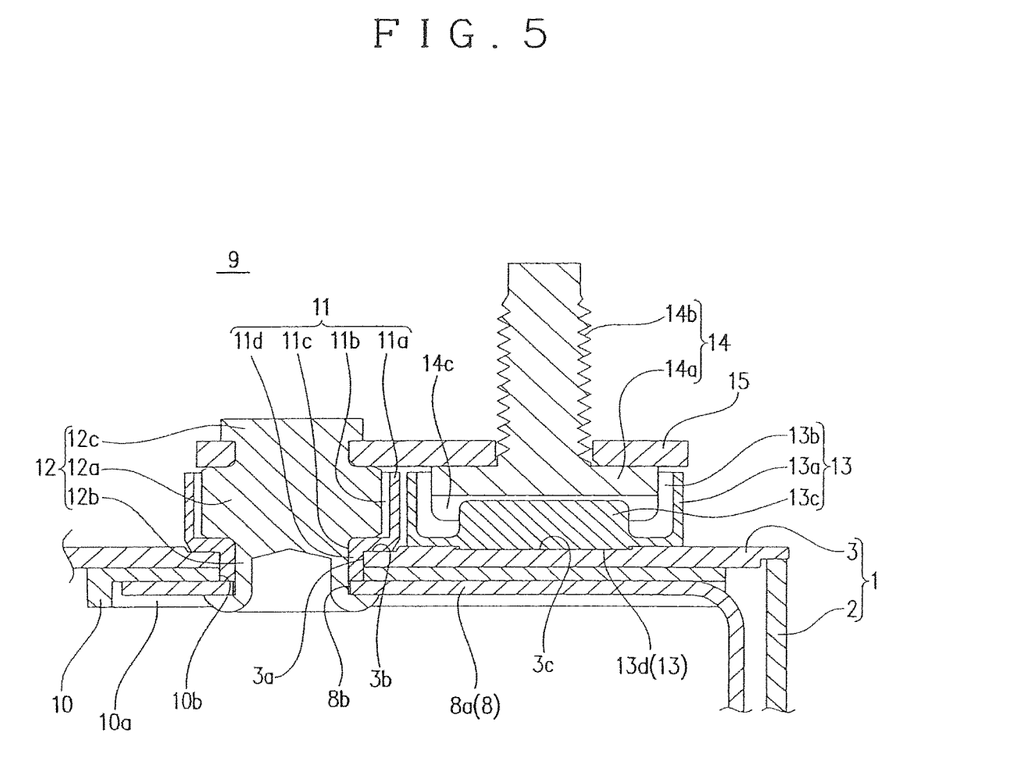
FIG. 5 is an enlarged cross-sectional view of a terminal part of the battery cell.
Figure 6:
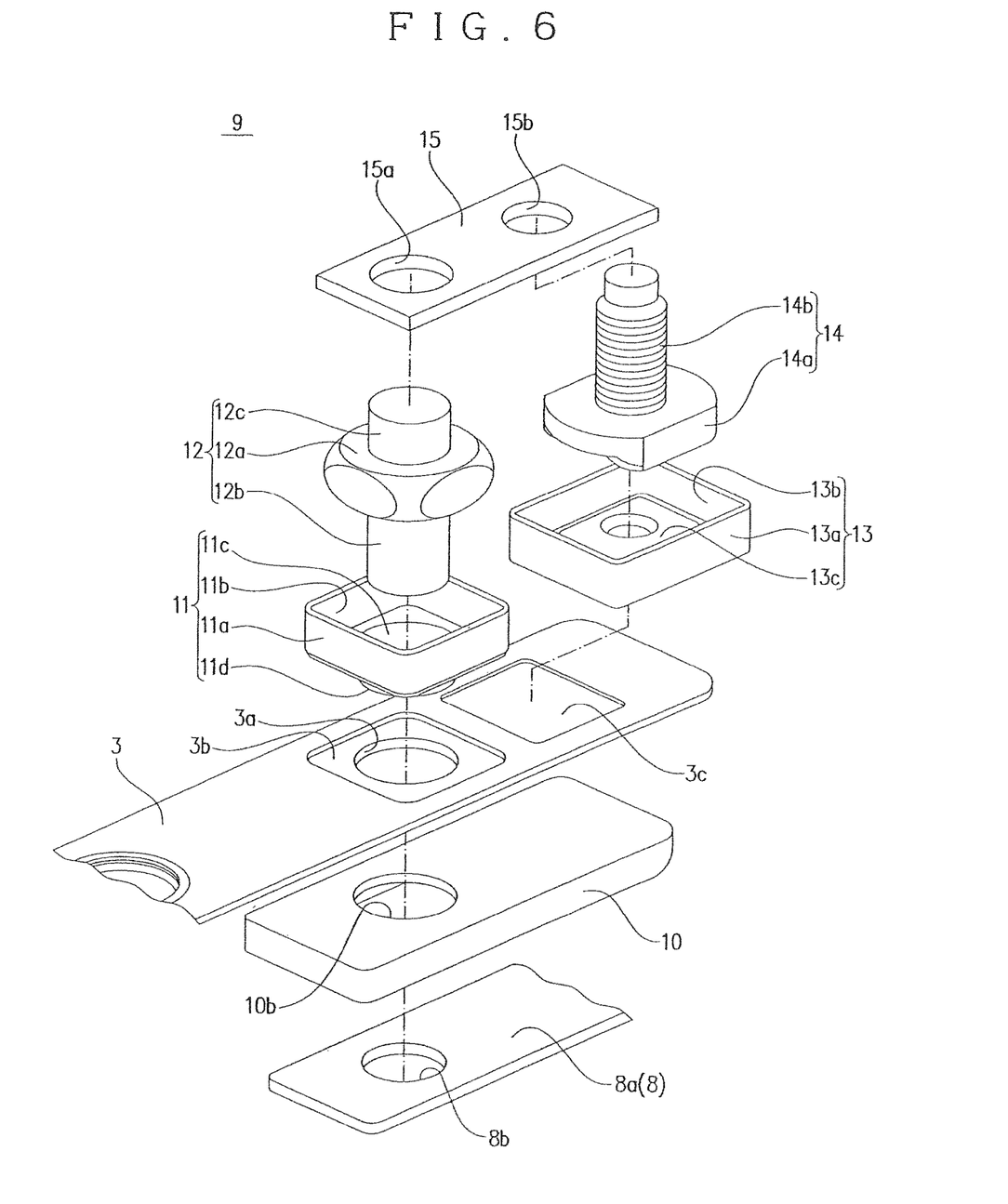
FIG. 6 is an exploded perspective view of the terminal part as seen from above.
Figure 7:
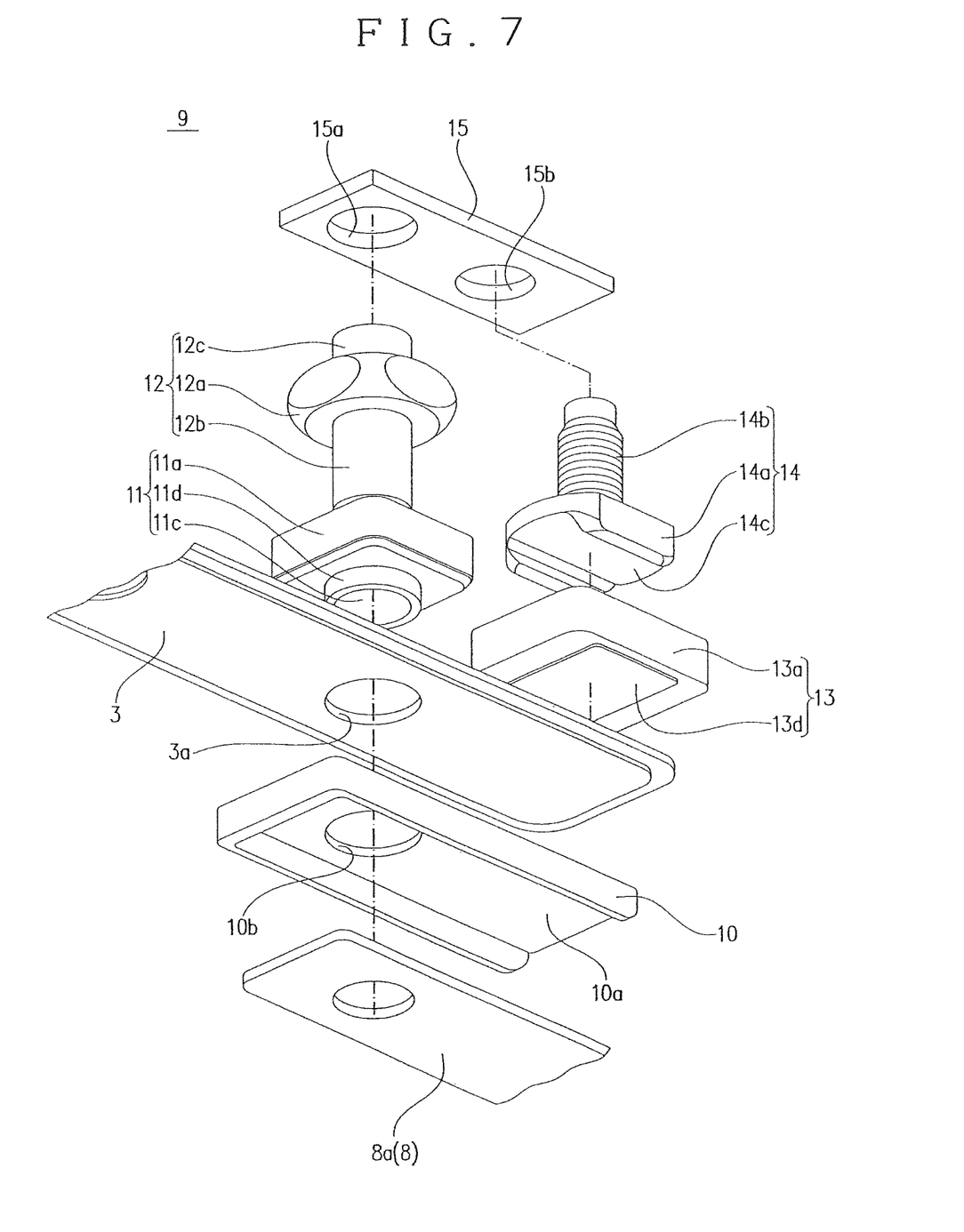
FIG. 7 is an exploded perspective view of the terminal part as seen from below.

Note that the plastic plate 10, the outer gasket 11 and the terminal retainer 13 are made of plastic, and therefore each represent a plastic member. Also, the plastic plate 10, outer gasket 11, and terminal retainer 13 have an insulating function and therefore each represent an insulating member. In particular, the outer gasket 11 (and the plastic plate 10 in some instances) has a sealing function and thus also represents a sealing member. The rivet 12 represents an auxiliary terminal. The terminal bolt 14 represents an external terminal. The connecting plate 15 represents a connecting conductor.

The plastic plate 10 is a synthetic resin with at least insulating properties. More specifically, for example, polyphenylene sulfide (PPS) resin is used as the material for the plastic plate 10. However, the material is not limited to this, and any appropriate material can be selected. The plastic plate 10 has a rectangular shape. A lower surface of the plastic plate 10 includes a recess 10a which can receive the connection part 8a of the current collector 8. The plastic plate 10 includes a through-hole 10b which coincides in position with a through-hole 8b formed in the connection part 8a while the recess 10a receives the connection part 8a of the current collector 8.

The outer gasket 11 is a synthetic resin with insulating properties and sealing properties. More specifically, for example, polyphenylene sulfide (PPS) resin is used as the material for the plastic plate 10. However, the material is not limited to this, and any appropriate material can be selected.

The outer gasket 11 is slightly larger than a body 12a of the rivet 12 and has a rectangular shape. The outer gasket 11 includes a surrounding circumferential outer wall part 11a at the outer periphery, which is formed by recessing an upper surface except for the outer periphery. The outer gasket 11 includes a recess 11b which can receive the body 12a of the rivet 12 inside the outer wall part 11a. The outer gasket 11 includes a through-hole 11c into which a first caulking part 12b of the rivet 12 can be inserted while the recess 11b receives the body 12a of the rivet 12. A lower surface of the outer gasket 11 includes an annular projection 11d which extends through the through-hole 3a of the cover plate 3 and is inserted into the through-hole 10b of the plastic plate 10.

Note that the plastic plate 10 is arranged on a lower surface (an inner surface) of the cover plate 3 and is thus arranged inside the case 1. The outer gasket 11 is arranged at an upper surface (the outer surface) of the cover plate 3 and is thus arranged at an outer surface of the case 1. A region of the upper surface of the cover plate 3 where the outer gasket 11 is arranged includes a non-circular recess (first recess) 3b which can receive a lower part (bridge part) of the outer gasket 11. When the lower part (a joining surface to the cover plate 3) of the outer gasket 11 is inserted into the first recess 3b, the outer gasket 11 is restrained from rotating about its axis. Note that, in the present embodiment, the first recess 3b is formed to be rectangular so as to correspond to the shape of the rectangular lower part of the outer gasket 11. The first recess 3b is formed by coining or the like.

The rivet 12 is a conductive metal member. More specifically, the rivet 12 for the positive electrode comprises aluminum or an aluminum alloy while the rivet 12 for the negative electrode comprises copper or a copper alloy. The first caulking part 12b projects downward from a lower surface of the body 12a of the rivet 12. A second caulking part 12c projects upward from an upper surface of the body 12a of the rivet 12. Note that, in the present embodiment, the first caulking part 12b is hollow (tubular) while the second caulking part 12c is solid (columnar). More specifically, the first caulking part 12b has a circular tubular shape while the second caulking part 12c has a circular columnar shape. However, the shape is not limited to this, and any appropriate shape can be selected.

The dimensional relationship among the through-hole 3a of the cover plate 3, the through-hole 8b of the connection part 8a of the current collector 8, the through-hole 10b of the plastic plate 10, the through-hole 11c and annular projection 11d of the outer gasket 11, and the first caulking part 12b of the rivet 12 will be described. As shown in detail in FIG. 5, the inner diameter of the through-hole 3a of the cover plate 3 and the inner diameter of the through-hole 10b of the plastic plate 10 are the same or substantially the same. The inner diameter of the through-hole 3a of the cover plate 3 and the inner diameter of the through-hole 10b of the plastic plate 10 are the same or substantially the same as the outer diameter of the annular projection 11d of the outer gasket 11. The length of the annular projection 11d of the outer gasket 11 is the same or substantially the same as the sum of the thicknesses of the cover plate 3 and plastic plate 10. The inner diameter of the annular projection 11d of the outer gasket 11 and the inner diameter of the through-hole 8b of the connection part 8a of the current collector 8 are the same or substantially the same. The inner diameter of the annular projection 11d of the outer gasket 11 and the inner diameter of the through-hole 8b of the connection part 8a of the current collector 8 are the same or substantially the same as the outer diameter of the first caulking part 12b of the rivet 12. The length of the first caulking part 12b of the rivet 12 is the same or substantially the same as the sum of the thicknesses of the cover plate 3, the connection part 8a of the current collector 8, the plastic plate 10, and the outer gasket 11.

Accordingly, the body 12a of the rivet 12 is inserted into the recess 11b of the outer gasket 11, the first caulking part 12b of the rivet 12 extends through the through-hole 11c at a bottom surface of the recess 11b and is inserted into the through-hole 8b of the connection part 8a of the current collector 8, and an end portion of the first caulking part 12b projecting downward from the through-hole 8b of the connection part 8a is caulked from below. With this configuration, the rivet 12 is attached to the cover plate 3 while the rivet 12 is electrically connected to the connection part 8a of the current collector 8 and is insulated from the cover plate 3.

The terminal retainer 13 is a synthetic resin with insulating properties, like the plastic plate 10 and outer gasket 11. Note that a reinforced resin material obtained by uniformly mixing polyphenylene sulfide resin with glass fiber as a filler, for example, is used as the material for the terminal retainer 13 in order to make the hardness higher than those of the plastic plate 10 and outer gasket 11. Alternatively, polytetrafluoroethylene-perfluoroalkylvinylether copolymer (PFA) resin is used instead of polyphenylene sulfide resin. An inorganic fiber other than glass fiber may be used. However, the material is not limited to this, and any appropriate material can be selected. However, the terminal retainer 13 may not have insulating properties. When aluminum or an aluminum alloy is used as a material for the case 1, the terminal retainer 13 of the positive electrode may be non-isolated so that the potential of the positive electrode may be identical with the potential of the case 1. This suppresses corrosion of the case 1. When iron or stainless steel is used as a material for the case 1, the terminal retainer 13 of the negative electrode may be non-isolated so that the potential of the negative electrode may be identical with the potential of the case 1. In order for the positive electrode or negative electrode and the case 1 to have an identical potential, the terminal retainer 13 may comprise a material containing a conductive material (e.g., carbon) as well as a filler mixed therein so that the terminal retainer 13 becomes semi-conductive, for example.

The terminal retainer 13 is slightly larger than a head 14a of the terminal bolt 14 and has a rectangular shape. The terminal retainer 13 includes a surrounding circumferential outer wall part 13a at the outer periphery, which is formed by recessing an upper surface except for the outer periphery. The terminal retainer 13 includes a recess 13b which can receive the head 14a of the terminal bolt 14 inside the outer wall part 13a. The terminal retainer 13 includes a non-circular fitting projection 13c in the recess 13b. The fitting projection 13c fits in a non-circular fitting recess (fitting groove) 14c formed in the head 14a of the terminal bolt 14 while the recess 13b receives the head 14a of the terminal bolt 14. Accordingly, when the fitting projection 13c in the recess 13b (i.e., the fitting projection 13c at a lower position than an upper end surface of the outer wall part 11a in the recess 13b) fits in the fitting recess 14c of the head 14a of the terminal bolt 14, the terminal retainer 13 receives the terminal bolt 14 while the terminal bolt 14 is restrained from rotating about its axis. Note that, in the present embodiment, the fitting recess 14c of the terminal bolt 14 is formed by cutting out a part extending from one side to the opposite side and has a rectangular shape. The fitting projection 13c of the terminal retainer 13 is formed to be rectangular so as to correspond to the rectangular fitting recess 14c.

A lower surface of the terminal retainer 13 includes a non-circular projection 13d. In the present embodiment, the projection 13d is a rectangular projecting surface (raised surface). A region of the upper surface of the cover plate 3 where the terminal retainer 13 is arranged includes a non-circular recess (second recess) 3c which can receive the projection 13d of the terminal retainer 13. When the projection 13d of the terminal retainer 13 is inserted into the second recess 3c, the terminal retainer 13 is restrained from rotating about its axis, like the outer gasket 11. Note that, in the present embodiment, the second recess 3c is formed to be rectangular so as to correspond to the rectangular projection 13d. The second recess 3c is formed by coining or the like.

When the terminal retainer 13 is to be arranged on the upper surface of the cover plate 3, the lower surface (including a surface of the projection 13d) of the terminal retainer 13 is treated by appropriate means so that the glass fiber is exposed at the lower surface of the terminal retainer 13. A preferred example of the appropriate means is to mechanically cut off the lower surface of the terminal retainer 13. For example, the glass fiber is exposed by cutting the lower surface of the terminal retainer 13 with a file or the like. The projection 13d at the lower surface of the terminal retainer 13 fits in the second recess 3c at the upper surface of the cover plate 3, and the terminal retainer 13 is fixed to the upper surface of the cover plate 3. A method for fixing the terminal retainer 13 to the cover plate 3 is not particularly limited. For example, appropriate adhesive means (e.g., an adhesive film, a liquid adhesive, or a solid adhesive) may be supplied to at least one of the upper surface (in particular, the second recess 3c) of the cover plate 3 and the lower surface of the terminal retainer 13, and the terminal retainer 13 may be fixed to the cover plate 3 via the adhesive means. Although a common adhesive can be used as the adhesive, an epoxy resin adhesive may preferably be used. An epoxy resin has poor adhesion to the synthetic resin used for the terminal retainer 13 but has good adhesion to an inorganic fiber. Accordingly, the glass fiber exposed at the lower surface of the terminal retainer 13 allows the terminal retainer 13 to be firmly bonded to the cover plate 3.

The terminal bolt 14 is intended to electrically connect the battery cell to an external device. The terminal bolt 14 is a conductive metal member with high strength made of iron, steel such as stainless steel and chromium molybdenum steel, or the like. As described above, the terminal bolt 14 includes the head 14a sized to be inserted into the recess 13b of the terminal retainer 13 and a shaft 14b projecting from an upper surface of the head 14a and having a male thread at an outer peripheral surface. A lower surface of the head 14a includes a non-circular fitting recess (fitting groove) 14c, as described above. Accordingly, when the fitting projection 13c in the recess 13b fits in the fitting recess 14c, the terminal bolt 14 is insulated from the cover plate 3 and is supported on the terminal retainer 13 while the shaft 14*b* is restrained from rotating about its axis.

The connecting plate 15 is a rectangular conductive metal member comprising a copper alloy or the like. A surface of the connecting plate 15 is plated with nickel for preventing rust, improving slipperiness, and other purposes. The connecting plate 15 includes a first through-hole 15*a* at one end and a second through-hole 15*b* at the other end. The second caulking part 12*c* of the rivet 12 is inserted into the first through-hole 15*a*. The shaft 14*b* of the terminal bolt 14 is inserted into the second through-hole 15*b*. An end portion of the second caulking part 12*c* of the rivet 12 which projects upward from the first through-hole 15*a* of the connecting plate 15 is caulked from above. With the caulking, the rivet 12 and connecting plate 15 are integrated.

Note that, in the terminal bolt 14, the shaft 14*b* is simply inserted into the second through-hole 15*b* of the connecting plate 15. However, for example, when a crimp contact of a lead wire of an external device (not shown) fits on the shaft 14*b* of the terminal bolt 14, and the shaft 14*b* of the terminal bolt 14 is fixed with a nut, the terminal bolt 14 is slightly lifted, and the upper surface of the head 14*a* comes into pressure contact with a lower surface of the connecting plate 15. This causes the crimp contact of the lead wire together with the connecting plate 15 to be held between the head 14*a* of the terminal bolt 14 and the nut. With this configuration, the crimp contact, terminal bolt 14, and connecting plate 15 are electrically connected to one another with reliability. Accordingly, the crimp contact of the lead wire is electrically connected to the electrode assembly 4 via the terminal bolt 14, connecting plate 15, rivet 12 and current collector 8 which are insulated from the cover plate 3 by the terminal retainer 13, outer gasket 11, and plastic plate 10. This causes the external device to be electrically connected to the battery cell.

Additionally, the fitting recess 14*c* of the head 14*a* of the terminal bolt 14 fitting on the fitting projection 13*c* in the recess 13*b* of the terminal retainer 13 fixed on the upper surface of the cover plate 3 reliably stops the terminal bolt 14 from rotating together with the nut when the nut is fixed to the shaft 14*b* of the terminal bolt 14. Even if there is some clearance between the fitting recess 14*c* of the head 14*a* of the terminal bolt 14 and the fitting projection 13*c* in the recess 13*b* of the terminal retainer 13, the terminal bolt 14 only rotates idly by a certain degree and poses no special problem.

At this time, since the terminal retainer 13 stops the terminal bolt 14 from rotating, the terminal retainer 13 receives rotational torque from the terminal bolt 14. However, the lower surface of the terminal retainer 13 with the glass fiber exposed is in intimate contact with the upper surface of the cover plate 3, and therefore the terminal retainer 13 is fixed with increased frictional resistance against the cover plate 3. Accordingly, the terminal retainer 13 is reliably stopped from rotating together with the terminal bolt 14 due to rotational torque from the terminal bolt 14. The second recess 3*c* of the upper surface of the cover plate 3 and the projection 13*d* at the lower surface of the terminal retainer 13 fitting in with each other make the rotation-stopping effect more remarkable. As described above, since adhesive means (e.g., an adhesive) is supplied to one of the upper surface (in particular, the second recess 3*c*) of the cover plate 3 and the lower surface of the terminal retainer 13, and the terminal retainer 13 is fixed to the cover plate 3 by the adhesive means, stopping of rotation is further ensured.

Note that if the perimeter of the shaft 14*b* (male thread part) of the terminal bolt 14 is smaller, i.e., the shaft 14*b* of the terminal bolt 14 has a smaller diameter, and a synthetic resin such as polyphenylene sulfide resin (PPS) is used alone as the material for the terminal retainer 13, the terminal retainer 13 may not withstand rotational torque from the terminal bolt 14. However, mixing of a synthetic resin with an inorganic fiber such as glass fiber enhances the strength of the terminal retainer 13. The mixing also contributes to cost reduction.

Since the terminal retainer 13 is provided separate from the outer gasket 11 at the cover plate 3, rotational torque is not transmitted to the outer gasket 11, which seals up a gap around the rivet 12. Accordingly, unintentional force is not applied to the outer gasket 11. Sealing with the outer gasket 11 (more specifically, sealing between the lower surface of the outer gasket 11 and the upper surface of the cover plate 3 (an upper surface of the first recess 3*b*), sealing between an outer peripheral surface of the annular projection 11*d* of the outer gasket 11 and an inner peripheral surface of the through-hole 3*a* of the cover plate 3 and an inner peripheral surface of the through-hole 10*b* of the plastic plate 10, and sealing between an inner peripheral surface of the annular projection 11*d* of the outer gasket 11 and an outer peripheral surface of the first caulking part 12*b* of the rivet 12) is not impaired.

Rotational torque applied to the shaft 14*b* of the terminal bolt 14 is not transmitted to the rivet 12, which is provided separate from the terminal bolt 14. Accordingly, a situation does not occur in which rotation of the rivet 12 causes the rivet 12 and the connection part 8*a* of the current collector 8 fixed by caulking to come loose to impair the connection therebetween. Additionally, unintentional force is not applied to the plastic plate 10 and outer gasket 11. Further, sealing with the plastic plate 10 and outer gasket 11 (more specifically, sealing between an upper surface of the plastic plate 10 and the lower surface of the cover plate 3, sealing between the lower surface of the outer gasket 11 and the upper surface of the cover plate 3 (the upper surface of the first recess 3*b*), sealing between the outer peripheral surface of the annular projection 11*d* of the outer gasket 11 and the inner peripheral surface of the through-hole 3*a* of the cover plate 3 and the inner peripheral surface of the through-hole 10*b* of the plastic plate 10, and sealing between the inner peripheral surface of the annular projection 11*d* of the outer gasket 11 and the outer peripheral surface of the first caulking part 12*b* of the rivet 12) is not impaired.

The separate provision of the outer gasket 11 and the terminal retainer 13 allows appropriate selection of a material with suitable hardness for a sealing member as the material for the outer gasket 11 and appropriate selection of a material with sufficient hardness to withstand rotational torque from the terminal bolt 14 as the material for the terminal retainer 13. More specifically, since the outer gasket 11 has a greater sealing effect when the outer gasket 11 deforms elastically to come into intimate contact with surfaces of the conductive members (the cover plate 3, current collector 8, and rivet 12), the outer gasket 11 is required to have a certain degree of flexibility. If the terminal retainer 13 is highly flexible, rotational torque from the terminal bolt 14 makes the fitting projection 13*c* likely to be worn and chipped. As the wear progresses, the rotation-stopping function of the terminal bolt 14 is impaired. For this reason, the terminal retainer 13 is required to have rigidity enough to withstand rotational torque from the terminal bolt 14.

In the rivet 12 according to the present embodiment, the dimension in an axial direction of the body 12a is set to be larger than that of a conventional one so as to prevent or reduce plastic deformation across the rivet 12 caused by caulking by the first caulking part 12b and second caulking part 12c. As a result, the position in height of the connecting plate 15 from the upper surface of the cover plate 3 is necessarily higher than that in a conventional terminal structure. The fitting projection 13c of the terminal retainer 13 according to the present embodiment is a part which directly receives rotational torque from the terminal bolt 14 when the terminal retainer 13 stops the terminal bolt 14 from rotating. Accordingly, the fitting projection 13c of the terminal retainer 13 needs to have a sufficient thickness in a direction of height so as to have strength enough to withstand rotational torque. As a result, the position in height of the head 14a of the terminal bolt 14 is high, and the position in height of the connecting plate 15 from the upper surface of the cover plate 3 is also necessarily higher than that in a conventional terminal structure. For this reason, in the present embodiment, the outer wall part 11a of the outer gasket 11 is high, and the creepage distance from the upper surface of the cover plate 3 to the upper end surface of the outer wall part 11a is long (the ratio of the creepage distance to the width dimension of the cover plate 3 is preferably 0.15 to 0.3). The outer wall part 13a of the terminal retainer 13 is high, and the creepage distance from the upper surface of the cover plate 3 to an upper end surface of the outer wall part 13a is long (the ratio of the creepage distance to the width dimension of the cover plate 3 is preferably 0.15 to 0.3).

More specifically, the outer wall part 11a of the outer gasket 11 is formed so as to entirely or substantially entirely cover the body 12a of the rivet 12 and such that the upper end surface of the outer wall part 11a is in contact with or is slightly spaced from the lower surface of the connecting plate 15. The outer wall part 13a of the terminal retainer 13 is formed so as to entirely or substantially entirely cover the head 14a of the terminal bolt 14 and such that the upper end surface of the outer wall part 13a is in contact with or is slightly spaced from the lower surface of the connecting plate 15.

With the above-described configuration, even if the battery cell is exposed to droplets of water generated by condensation or the like or a conductive atmosphere (static electricity or dust), the outer wall part 11a of the outer gasket 11 and the outer wall part 13a of the terminal retainer 13 serve as covers (or barriers). This conveniently prevents a short between the cover plate 3 and the rivet 12 and a short between the cover plate 3 and the terminal bolt 14.

Note that an electric storage device according to the present invention is not limited to the above-described embodiment and that various changes may be made without departing from the spirit and scope of the present invention.

For example, the above embodiment has illustrated an example in which a resin material obtained by uniformly mixing a synthetic resin material with glass fiber as a filler is used as the material for the terminal retainer 13. However, this resin material can also be used for the outer gasket 11. The resin material can also be used as the sealing member of the battery cell disclosed in Patent Document 1 (a battery cell with a structure in which an external terminal and a current collector are directly connected) or the battery cell disclosed in Patent Document 2 (a battery cell with a structure in which an external terminal and a current collector are indirectly connected to each other via an auxiliary terminal and a connecting conductor). However, a resin material obtained by uniformly mixing a synthetic resin material (base material) with glass fiber as a filler has higher hardness than the material containing only the base material without the glass fiber, and thus has less flexibility to produce less sealing effect. Accordingly, a material with low hardness is preferably preselected as the base material in expectation of an increase in hardness caused by inclusion of glass fiber. Note that the auxiliary terminal and external terminal are integrated in the battery cell disclosed in Patent Document 1. Accordingly, the number of parts and the number of fabrication steps can be reduced.

The above embodiment has also illustrated an example in which the entire lower surface of the outer gasket 11 fits in the first recess 3b in the upper surface of the cover plate 3. Alternatively, a projection may be formed at the lower surface of the outer gasket 11, the first recess of the cover plate 3 may be sized to receive the projection, and the projection of the outer gasket 11 may fit in the first recess, as with the case of the terminal retainer 13.

The above embodiment has also illustrated an example in which the projection 13d is formed in the lower surface of the terminal retainer 13, the second recess 3c sized to receive the projection 13d is formed in the upper surface of the cover plate 3, and the projection 13d of the terminal retainer 13 fits in the second recess 3c of the cover plate 3. Alternatively, the projection 13d may not be formed, the second recess of the cover plate 3 may be sized to receive the entire lower surface of the terminal retainer 13, and the entire lower surface of the terminal retainer 13 may fit in the second recess, as with the case of the outer gasket 11.

Alternatively, the first recess 3b may not be formed in the cover plate 3, so that the outer gasket 11 may be arranged at a flat part of the upper surface of the cover plate 3. The second recess 3c may not be formed in the cover plate 3, so that the terminal retainer 13 may be arranged at a flat part of the upper surface of the cover plate 3.

It is preferred, however, that the cover plate 3 have the first recess 3b and second recess 3c because they can increase the moment of area of the cover plate 3, which results in enhancement of the mechanical strength of the cover plate 3. In this case, reducing the size of one of the first recess 3b and the second recess 3c increases the distance between the first recess 3b and the second recess 3c. This prevents the first recess 3b and second recess 3c from affecting each other. The above embodiment has illustrated an example in which the first recess 3b for the outer gasket 11 is larger than the second recess 3c for the terminal retainer 13. This configuration is adopted on the ground that the flatness and mechanical strength of the cover plate 3 increase with an increase in the area of the first recess 3b, which results in an increase in sealing effect and durability.

For either the outer gasket 11 or the terminal retainer 13, the number of projections is not limited to one, and a plurality of projections may be formed. The outer gasket 11 and terminal retainer 13 need not be rectangular. For example, the outer gasket 11 and terminal retainer 13 may be circular, hexagonal, or octagonal.

The above embodiment has illustrated an example in which the current collector 8 for the positive electrode and the rivet 12 for the positive electrode comprises aluminum or an aluminum alloy while the current collector 8 for the negative electrode and the rivet 12 for the negative electrode comprises copper or a copper alloy. However, any materials may be used as long as the materials are conductive metal materials appropriate to the type of a battery cell. The above embodiment has also illustrated the materials for the terminal bolt 14 and connecting plate 15. However, any materials may be used as long as the materials are conductive metal materials whose properties such as strength and conductivity are appropriate.

The above embodiment has illustrated an example in which the shaft (male thread part) 14b projects from the upper surface of the head 14a of the terminal bolt 14. However, a shaft in an appropriate form such as a circular or polygonal tube may project instead of the male thread part, and a threaded hole may be formed in an upper end surface of the shaft.

The electrode assembly is not limited to one of the winding type in the form of an elliptic cylinder as described in the above embodiment. The electrode assembly may have any other shape and may be one of the stacked type.

The above embodiment has illustrated an example in which the case 1 comprises an aluminum alloy, steel, or the like. However, any material may be used for the case 1 (the case body 2 and cover plate 3). Accordingly, a material other than metal, such as an insulating material, can be used. The shape and structure of the case 1 (the case body 2 and cover plate 3) are not limited to those described in the above embodiment, and any shape and structure may be adopted.

The above embodiment has illustrated an example in which the terminal structures 9 are arranged at the cover plate 3. However, the terminal structures 9 may be arranged at the case body 2.

The above embodiment has been described in the context of a lithium ion secondary battery cell. However, the type and size (capacity) of a battery cell may be arbitrarily selected.

The present invention is not limited to lithium ion secondary battery cells and can also be applied to various secondary battery cells, primary battery cells, and capacitors such as an electric double layer capacitor.

The invention claimed is:

1. An electric storage device, comprising:
an electrode assembly;
a case housing the electrode assembly;
a plastic member arranged at an outer surface of the case and including a joining surface of the plastic member facing the outer surface of the case;
an external terminal supported by the plastic member and electrically connected to the electrode assembly;
a sealing member arranged at the outer surface of the case, the sealing member including a joining surface of the sealing member facing the outer surface of the case; and
an auxiliary terminal supported by the sealing member, the auxiliary terminal extending from inside to outside the case, being electrically connected to the electrode assembly, and being electrically connected to the external terminal,
wherein the plastic member comprises a material having a hardness greater than a hardness of the sealing member,
wherein the case includes a first recess which is configured to receive a part of the joining surface of the sealing member in a predetermined region of the outer surface of the case and is provided at a periphery of a through-hole of the case, and a second recess which is configured to receive a part of the joining surface of the plastic member in a predetermined region of the outer surface of the case, which is different from the predetermined region of the outer surface of the case,
wherein the plastic member and the sealing member are arranged in a vicinity of each other, and
wherein an area of the first recess for the sealing member is greater than an area of the second recess for the plastic member.

2. The electric storage device according to claim 1, wherein the plastic member comprises a synthetic resin comprising an inorganic fiber.

3. The electric storage device according to claim 2, wherein the plastic member is bonded to the outer surface of the case with the inorganic fiber exposed at the joining surface of the plastic member.

4. The electric storage device according to claim 2, wherein the plastic member comprises a resin material obtained by uniformly mixing a synthetic resin material with a glass fiber as a filler.

5. The electric storage device according to claim 1, further comprising:
a current collector connected to the electrode assembly and connected to the auxiliary terminal; and
a connecting conductor connecting together the auxiliary terminal and the external terminal.

6. The electric storage device according to claim 1, wherein the plastic member includes a surrounding circumferential outer wall part and a recess inside the outer wall part,
wherein the external terminal includes a head to be inserted into the recess of the plastic member and a shaft projecting from one surface of the head, and
wherein the outer wall part of the plastic member has a height that is sufficient for the recess of the plastic member to substantially entirely receive the head of the external terminal.

7. The electric storage device according to claim 1, wherein the external terminal includes a head and a shaft projecting from a surface of the head, and
wherein the shaft includes a male thread part.

8. The electric storage device according to claim 1, wherein the plastic member is bonded to the outer surface of the case with an adhesive.

9. The electric storage device according to claim 8, wherein the adhesive comprises an epoxy resin adhesive.

10. The electric storage device according to claim 1, wherein the case includes a case body including an opening and a cover plate which covers the opening of the case body to seal the case, and
wherein the plastic member is arranged at an outer surface of the cover plate.

11. An electric storage device, comprising:
an electrode assembly;
a case housing the electrode assembly;
a plastic member including a joining surface of the plastic member facing an outer surface of the case;
an external terminal supported by the plastic member and electrically connected to the electrode assembly; and
a sealing member arranged to face the outer surface of the case, the sealing member including a joining surface of the sealing member facing the outer surface of the case,
wherein a hardness of the plastic member is greater than a hardness of the sealing member,
wherein the case includes a first recess which is configured to receive a part of the joining surface of the sealing member in a predetermined region of the outer surface of the case and is provided at a periphery of a through-hole of the case, and a second recess which is configured to receive a part of the joining surface of the plastic member in a predetermined region of the outer surface of the case, which is different from the predetermined region of the outer surface of the case, wherein the plastic member and the sealing member are arranged in a vicinity of each other, and wherein an area of the first recess for the sealing member is greater than an area of the second recess for the plastic member.

12. The electric storage device according to claim 11, further comprising:

an auxiliary terminal supported by the sealing member, the auxiliary terminal extending from inside to outside the case, and being electrically connected to the electrode assembly and to the external terminal.

13. The electric storage device according to claim 11, wherein the plastic member comprises a synthetic resin comprising an inorganic fiber.

14. The electric storage device according to claim 13, wherein the plastic member is bonded to the outer surface of the case with the inorganic fiber exposed at the joining surface.

15. An electric storage device, comprising:

an electrode assembly;

a case housing the electrode assembly;

a plastic member bonded to an outer surface of the case and including a joining surface facing the outer surface of the case; and an external terminal supported by the plastic member, wherein the plastic member comprises a fiber exposed at the joining surface.

16. The electric storage device according to claim 15, wherein the fiber comprises an inorganic fiber.

17. The electric storage device according to claim 15, wherein the external terminal is electrically connected to the electrode assembly.

18. The electric storage device according to claim 1, wherein the plastic member comprises a fiber exposed at the joining surface of the plastic member.

19. The electric storage device according to claim 1, wherein the plastic member is bonded to the outer surface of the case with a fiber exposed at the joining surface of the plastic member.

20. The electric storage device according to claim 11, wherein the plastic member comprises a fiber exposed at the joining surface of the plastic member.

* * * * *